United States Patent
Coppola et al.

(10) Patent No.: US 12,504,901 B2
(45) Date of Patent: Dec. 23, 2025

(54) POWER DOWN OF MEMORY DEVICE BASED ON HARDWARE RESET SIGNAL

(71) Applicant: Micron Technology, Inc., Boise, ID (US)

(72) Inventors: Gianluca Coppola, Liveri (IT); Steffen Buch, Taufkirchen (DE)

(73) Assignee: Micron Technology, Inc., Boise, ID (US)

( * ) Notice: Subject to any disclaimer, the term of this patent is extended or adjusted under 35 U.S.C. 154(b) by 30 days.

(21) Appl. No.: 18/585,772

(22) Filed: Feb. 23, 2024

(65) Prior Publication Data

US 2024/0289035 A1 Aug. 29, 2024

Related U.S. Application Data

(60) Provisional application No. 63/486,518, filed on Feb. 23, 2023.

(51) Int. Cl.
*G06F 3/06* (2006.01)

(52) U.S. Cl.
CPC .......... *G06F 3/0632* (2013.01); *G06F 3/0604* (2013.01); *G06F 3/0679* (2013.01)

(58) Field of Classification Search
CPC ....... G06F 3/0604; G06F 3/0679; G06F 9/442
See application file for complete search history.

(56) References Cited

U.S. PATENT DOCUMENTS

| | | | |
|---|---|---|---|
| 2004/0015848 A1* | 1/2004 | Bystedt | G06F 9/4493 717/127 |
| 2010/0008175 A1* | 1/2010 | Sweere | G11C 11/005 365/228 |
| 2017/0091042 A1* | 3/2017 | Chou | G06F 11/1441 |
| 2021/0373939 A1* | 12/2021 | Liang | G06F 9/485 |
| 2023/0376217 A1* | 11/2023 | Lee | G06F 3/0673 |
| 2024/0087657 A1* | 3/2024 | Eguchi | G11C 5/14 |

* cited by examiner

*Primary Examiner* — Nicholas A. Paperno
(74) *Attorney, Agent, or Firm* — Harrity & Harrity, LLP

(57) ABSTRACT

In some implementations, a memory device may receive, from a host device, a hardware reset signal. The memory device may determine that a level associated with the hardware reset signal satisfies a threshold for a period of time. The memory device may determine, based on the hardware reset signal satisfying the threshold for the period of time, that the host device is expected to power down the memory device. The memory device may complete an ongoing memory operation within a remaining time period based on the determination that the host device is expected to power down the memory device.

20 Claims, 8 Drawing Sheets

POWER DOWN OF MEMORY DEVICE BASED ON HARDWARE RESET SIGNAL

CROSS-REFERENCE TO RELATED APPLICATION

This patent application claims priority to U.S. Provisional Patent Application No. 63/486,518, filed on Feb. 23, 2023, and entitled "POWER DOWN OF MEMORY DEVICE BASED ON HARDWARE RESET SIGNAL." The disclosure of the prior application is considered part of and is incorporated by reference into this patent application.

TECHNICAL FIELD

The present disclosure generally relates to memory devices, memory device operations, and, for example, to powering down a memory device based on a hardware reset signal.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

Figure 1:
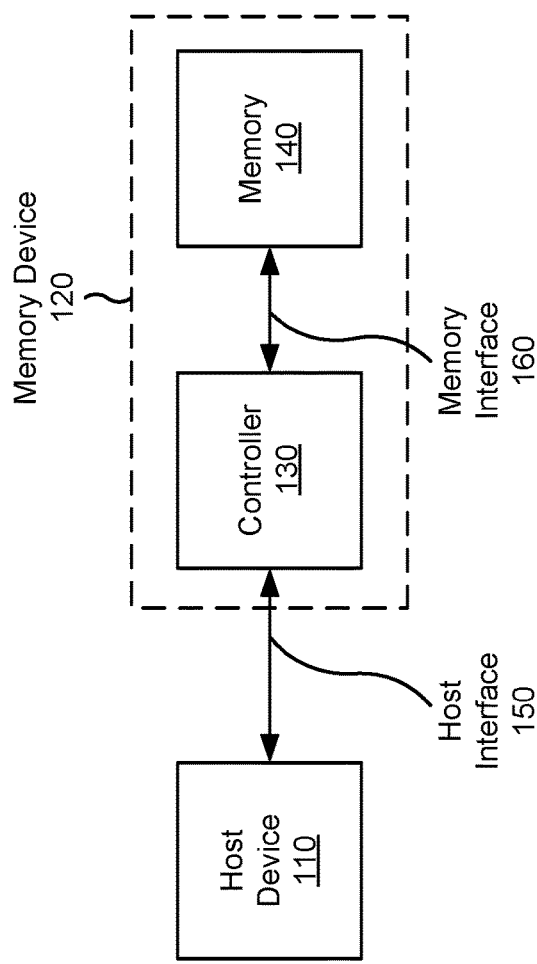
FIG. 1 is a diagram illustrating an example system capable of powering down a memory device based on a hardware reset signal.

A host device may notify a memory device, such as a universal flash storage (UFS) device which may be a managed NAND (mNAND) device, when the host device is expected to power down (or power off) the memory device. The host device may notify the memory device using a power off notification, which may provide the memory device with time to cleanly complete any ongoing operations before the host device powers off the memory device. The memory device may respond to the host device when the memory device is ready to be powered off. At this point, the host device may power off the memory device without the risk of data loss.

The host device may send the power off notification to the memory device using a software command. When the power off notification is enabled, the memory device may be able to complete any outstanding memory operations before the host device powers down the memory device, and a next bootup (e.g., a next power on) may occur without a delay, as compared to when the host device powers down the memory device without the memory device completing any outstanding memory operations.

In some cases, a host device may not be able to issue the power off notification before powering down a memory device. The host device may be designed in a manner that does not allow the hardware of the host device and the software of the host device to work together to send the power off notification in time (e.g., before the memory device is shut down). Without the power off notification, the memory device may undergo a power down that is considered to be a dirty power down or a dirty shutdown, meaning that the memory device is powered off without possibly completing any outstanding memory operations, which may cause the delay at the next bootup. "Power down" and "shutdown" may be used interchangeably herein.

In some implementations, a memory device may receive, from a host device, a hardware reset signal. The memory device may determine that a level associated with the hardware reset signal satisfies a threshold for a period of time. The memory device may determine, based on the hardware reset signal satisfying the threshold for the period of time, that the host device is expected to power down the memory device. The memory device may complete an ongoing memory operation within a remaining time period based on the determination that the host device is expected to power down the memory device. In some implementations, the hardware reset signal, when satisfying the threshold for the period of time, may serve to notify the memory device that the host device is planning to power down the memory device. The hardware reset signal may be used to have a clean power down, such that the memory device may complete any outstanding memory operations before the memory device is powered off. As a result, the power down of the memory device may not cause data loss, and when the memory device boots up a next time, the bootup time may not be increased due to errors needing to be corrected from the previous power down.

In some implementations, notifying the memory device of an upcoming power down using the hardware reset signal may allow the memory device to employ a clean power down, which may be useful when a host device is not able to issue the power off notification via the software command before powering down the memory device. By notifying the memory device of the upcoming power down via the hardware reset signal, the memory device may avoid the delay during the next bootup of the memory device, thereby improving a performance of the memory device.

FIG. 1 is a diagram illustrating an example system 100 capable of powering down a memory device based on a hardware reset signal. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a UFS interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to receive, from the host device 110, a hardware reset signal; determine that a level associated with the hardware reset signal satisfies a threshold for a period of time; determine, based on the hardware reset signal satisfying the threshold for the period of time, that the host device 110 is expected to power down the memory device; and complete an ongoing memory operation within a remaining time period based on the determination that the host device 110 is expected to power down the memory device.

In some implementations, the memory device 120 and/or the controller 130 may be configured to receive, from the host device 110, a hardware reset signal; determine that the hardware reset signal corresponds to a predefined pattern; determine, based on the hardware reset signal corresponding to the predefined pattern, that the host device 110 is expected to power down the memory device 120; and complete an ongoing memory operation within a remaining time period based on the determination that the host device 110 is expected to power down the memory device 120.

In some implementations, the host device 110 may be configured to provide a hardware reset signal at a level that satisfies a threshold for a period of time, wherein the hardware reset signal is provided based on an expected power down of a memory device. The memory device 120 and/or the controller 130 may be configured to receive the hardware reset signal from the host device 110; determine that the level associated with the hardware reset signal satisfies the threshold for a period of time; determine, based on the hardware reset signal satisfying the threshold for the period of time, that the host device 110 is expected to power down the memory device 120; and complete any ongoing memory operations within a remaining time period based on the determination that the host device 110 is expected to power down the memory device 120.

As indicated above, FIG. 1 is provided as an example. Other examples may differ from what is described with regard to FIG. 1.

Figure 2:
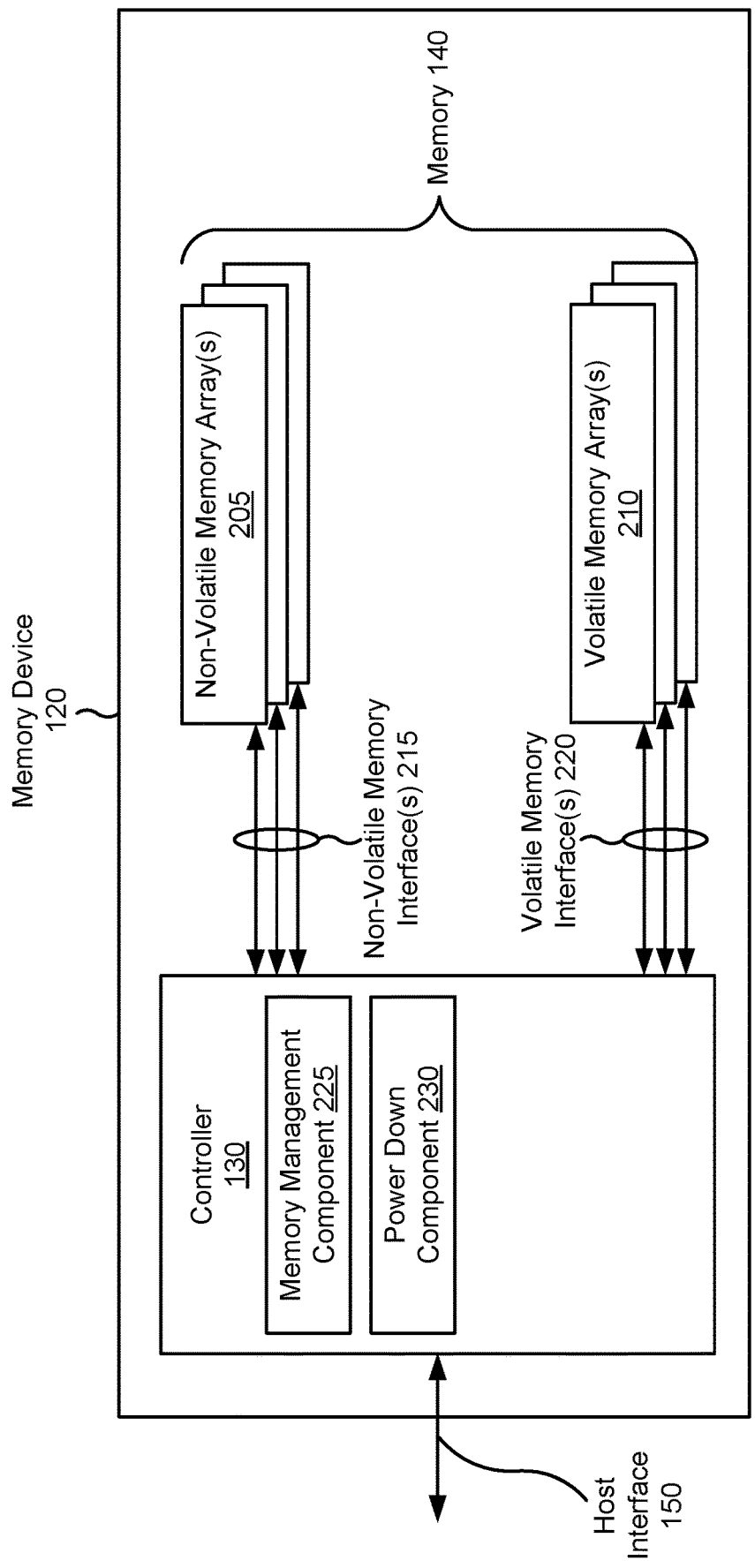
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, and/or a power down component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The power down component 230 may be configured to receive, from the host device 110, a hardware reset signal. The power down component 230 may be configured to determine that a level associated with the hardware reset signal satisfies a threshold for a period of time. The power down component 230 may be configured to determine, based on the hardware reset signal satisfying the threshold for the period of time, that the host device 110 is expected to power down the memory device 120. The power down component 230 may be configured to complete an ongoing memory operation within a remaining time period based on the determination that the host device 110 is expected to power down the memory device 120.

The power down component 230 may be configured to receive, from the host device 110, a hardware reset signal. The power down component 230 may determine that the hardware reset signal corresponds to a predefined pattern. The power down component 230 may determine, based on the hardware reset signal corresponding to the predefined pattern, that the host device 110 is expected to power down the memory device 120. The power down component 230 may complete an ongoing memory operation within a remaining time period based on the determination that the host device 110 is expected to power down the memory device 120.

One or more devices or components shown in FIG. 2 may be configured to perform operations described herein, such as one or more operations and/or methods described in connection with FIGS. 3-8. For example, the controller 130, the memory management component 225, and/or the power down component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

A memory device 120, such as a UFS device, may be associated with a hardware reset signal. The hardware reset signal may be a dedicated signal that is defined for the memory device 120. The hardware reset signal may be associated with a hardware pin of the memory device 120. The hardware pin may be a hardware reset input pin. The hardware pin may be used for resetting the memory device 120. A resetting of the memory device 120 may or may not involve a power cycle for the memory device 120. The memory device 120 may be an mNAND device.

Figure 3:
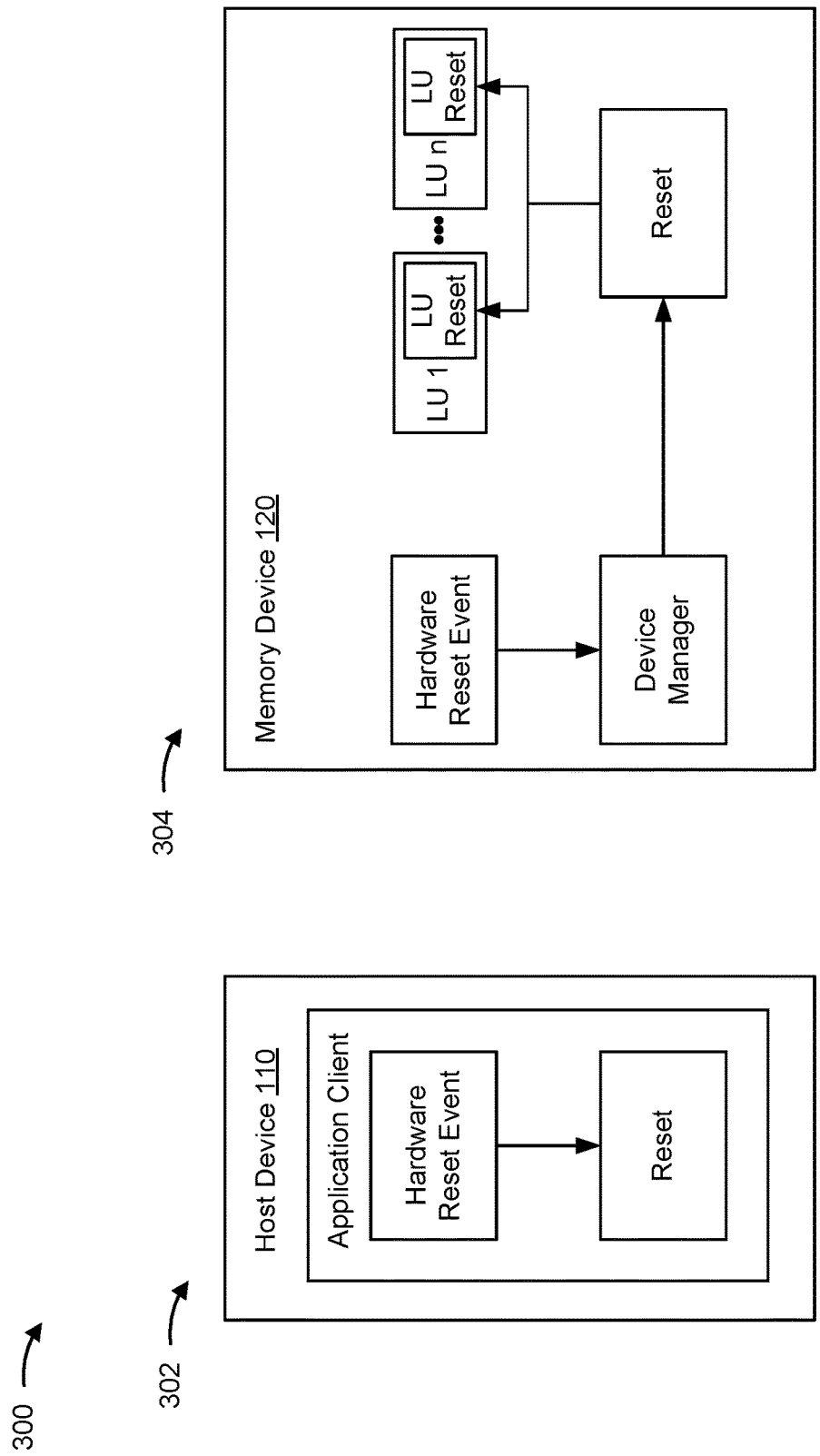
FIG. 3 is a diagram illustrating an example of a hardware reset.

FIG. 3 is a diagram illustrating an example 300 of a hardware reset. The operations described in connection with FIG. 3 may be performed by the memory device 120 and/or one or more components of the memory device 120, such as the controller 130 and/or one or more components of the controller 130.

As shown by reference number 302, a host device 110 may run an application client. The application client may be associated with a hardware reset event, which may trigger a hardware reset for the memory device 120. As shown by reference number 304, the hardware reset event may be detected by a device manager of the memory device 120. The device manager may initiate the hardware reset for the memory device 120, which may be based on the hardware reset event. The hardware reset may involve resetting a plurality of logical units (LUs) (e.g., LU 1 to LU n), where each LU may be associated with an LU hardware reset.

As indicated above, FIG. 3 is provided as an example. Other examples may differ from what is described with regard to FIG. 3.

Figure 4:
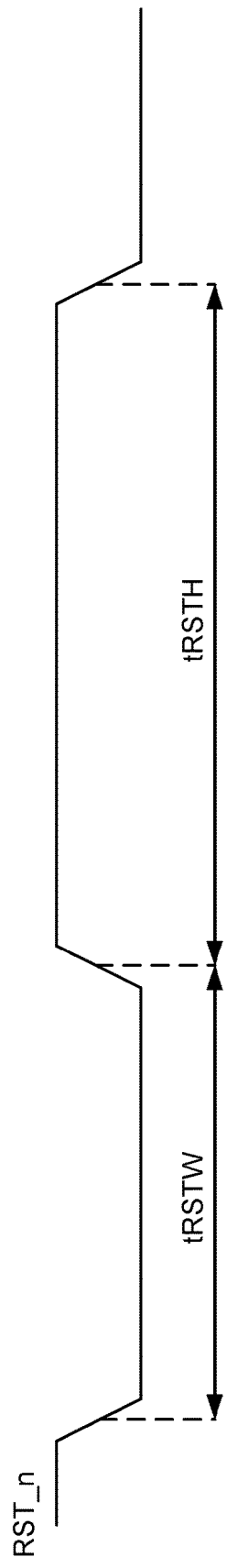
FIG. 4 is a diagram illustrating an example of a hardware reset timing.

FIG. 4 is a diagram illustrating an example 400 of a hardware reset timing. The operations described in connection with FIG. 4 may be performed by the memory device 120 and/or one or more components of the memory device 120, such as the controller 130 and/or one or more components of the controller 130.

As shown in FIG. 4, a hardware reset signal (RST_n) may be received at a hardware pin associated with the memory device 120. The hardware pin may be a hardware reset input pin, and may be used for resetting the memory device 120. The resetting of the memory device 120 may or may not involve a power cycle of the memory device 120. The hardware reset signal may be received from the host device 110. The hardware reset signal may initially be at a high level. The hardware reset signal may decrease to a low level for a first period of time. The first period of time may be associated with a first reset timing parameter (tRSTW), which may be associated with an RST_n pulse width. The RST_n pulse width may have a minimum length of 1 μs, and the RST_n pulse width may not be associated with a maximum length. After the hardware reset signal is at the low level for the period of time, the hardware reset signal may return to the high level. The hardware reset signal may be at the high level for a second period of time. The second period of time may be associated with a second reset timing parameter (tRSTH), which may be associated with an RST_n high period (interval). The RST_n high period may have a minimum length of 1 μs, and the RST_n high period may not be associated with a maximum length. After the hardware reset signal returns to the high level, the memory device 120 may be reset, which may or may not involve a power cycle of the memory device 120. The hardware reset signal may be at the low period for the period of time, which may be a predefined amount of time, and then return back to the high level, after which the hardware reset signal may be recognized as triggering a hardware reset.

The hardware reset signal may be an active low signal. The memory device 120 may not detect 100 nanoseconds or less of a positive or a negative RST_n pulse. The memory device 120 may detect more than or equal to 1 us of a positive or a negative RST_n pulse width.

As indicated above, FIG. 4 is provided as an example. Other examples may differ from what is described with regard to FIG. 4.

A host device may notify a memory device when the host device is expected to power down the memory device. The host device may notify the memory device using a power off notification. The host device may notify the memory device before the host device powers off the memory device. The host device may send the notification to the memory device prior to the host device cutting power to the memory device. The memory device may notify the memory device by requesting the memory device to move to a power down power mode (e.g., a UFS power down power mode), which may provide the memory device with time to cleanly complete any ongoing operations before the host device powers off the memory device. For example, based on the request to move to the power down power mode, the memory device may initiate the completion of any outstanding memory operations. The memory device may respond to the host device when the memory device is ready to be powered off. The memory device may respond to the host device after the memory device has entered the power down power mode. In other words, the memory device may respond when ready to be powered off, which may mean that the memory device has entered the power down power mode. At this point, the host device may power off the memory device without the risk of data loss.

The host device may send the power off notification to the memory device, which may indicate to the memory device that the host device is going to power off the memory device, and that the memory device should complete any remaining memory operations. The power off notification may be a software feature. When the power off notification is enabled, the memory device may be able to complete any outstanding memory operations before the host device powers down the memory device, and a next bootup (e.g., a next power on) may occur without a delay, as compared to when the host device powers down the memory device without the memory device completing any outstanding memory operations. In other words, when the power off notification is enabled, the next bootup may take a shorter period of time, and when the power off notification is not enabled, the next bootup may take a longer period of time. The longer period of time may not be applicable to when the memory is powered down, but rather to when the memory device starts up a next time. The memory device may take the longer period of time at the next bootup because the memory device may need to check whether any errors occurred when the memory device was powered off, and the memory device may need to correct such errors.

In some cases, a host device may not be able to issue the power off notification before powering down a memory device. The host device may be designed in a manner that does not allow the hardware of the host device and the software of the host device to work together to send the power off notification in time (e.g., before the memory device is shut down). The host device may not have proper coordination between the hardware for powering off the memory device and the software for providing the power off notification, which may result in the memory device being powered off without receiving the power off notification. Without the power off notification, the memory device may undergo a power down that is considered to be a dirty power down or a dirty shutdown, meaning that the memory device is powered off without possibly completing any outstanding memory operations, which may cause the longer period of time at the next bootup.

A system bootup may be a key parameter for a host device. In order to reduce a system bootup time, the Joint Electron Device Engineering Council (JEDEC) recommendation may be to use the power off notification feature before powering down the memory device. The power off notification may provide the memory device with time to cleanly complete ongoing memory operations. However, some host software does not implement the power off notification. A power off may be driven by a host power management integrated circuit (PMIC) at a hardware level, and the host device may be unable to issue a software command before powering the memory device off.

In some implementations, a memory device may receive, from a host device, a hardware reset signal. The memory device may determine that a level associated with the hardware reset signal satisfies a threshold for a period of time. The memory device may determine, based on the hardware reset signal satisfying the threshold for the period of time, that the host device is expected to power down the memory device. The memory device may complete an ongoing memory operation within a remaining time period based on the determination that the host device is expected to power down the memory device. In some implementations, the hardware reset signal, when satisfying the threshold for the period of time, may serve to notify the memory device that the host device is planning to power down the memory device. The hardware reset signal may be used to have a clean power down, which may involve the memory device being notified of an upcoming power down that is initiated by the host processor. In this case, the memory device may attempt to complete any outstanding memory operations before the memory device is powered off. As a result, the power down of the memory device may not cause data loss, and when the memory device boots up a next time, the bootup time may not be increased due to errors needing to be corrected from the previous power down.

In some implementations, the hardware reset signal may be associated with a hardware pin. The hardware pin may be a hardware reset input pin. The hardware pin may be exploited to inform the memory device that the host device is going to power off the memory device. Before the host device powers off the memory device, the host device may send the hardware reset signal at a relatively low level. In other words, the host device may pull the hardware pin down before powering off the memory device. After a certain amount of time with the hardware reset signal at the relatively low level, the memory device may recognize that the hardware reset signal is indicating that the host device is going to power off the memory device. The memory device may cleanly complete any ongoing memory operations. In other words, after the certain amount of time with a hardware reset input at the relatively low level, a firmware of the memory device may recognize the hardware reset input, and then cleanly complete any ongoing memory operations.

In some implementations, the host device may be required to keep a power supply on for a certain period of time after the hardware reset input, which may be longer than a JEDEC minimum reset timing parameter, but such an approach may allow the firmware of the memory device to perform a clean power down. In other words, by keeping the power supply on for the certain period of time, the memory device may have sufficient time to complete any ongoing memory operations. In some implementations, a field may be defined in a register of the memory device, where the field may indicate a required power on time after the hardware reset input. The memory device may communicate the field to the host device. The host device may continue to provide power to the memory device for a certain period of time after the hardware reset input depending on the indication of the field received from the memory device.

In some implementations, an ability to notify the memory device of an upcoming power down using the hardware reset signal may allow the memory device to employ a clean power down, which may be useful when a host device is not able to issue the power off notification via the software command before powering down the memory device. By notifying the memory device of the upcoming power down via the hardware reset signal, the memory device may avoid having a dirty power down, which may occur when the memory device is not notified of the upcoming power down and may be in the middle of an ongoing memory operation when powered down. By avoiding the dirty power down, a subsequent bootup of the memory device may not be delayed, thereby improving a performance of the memory device. The memory device may be associated with a clean power down and a faster system boot up, even when the memory device does not receive the power off notification before being powered down.

Figure 5:
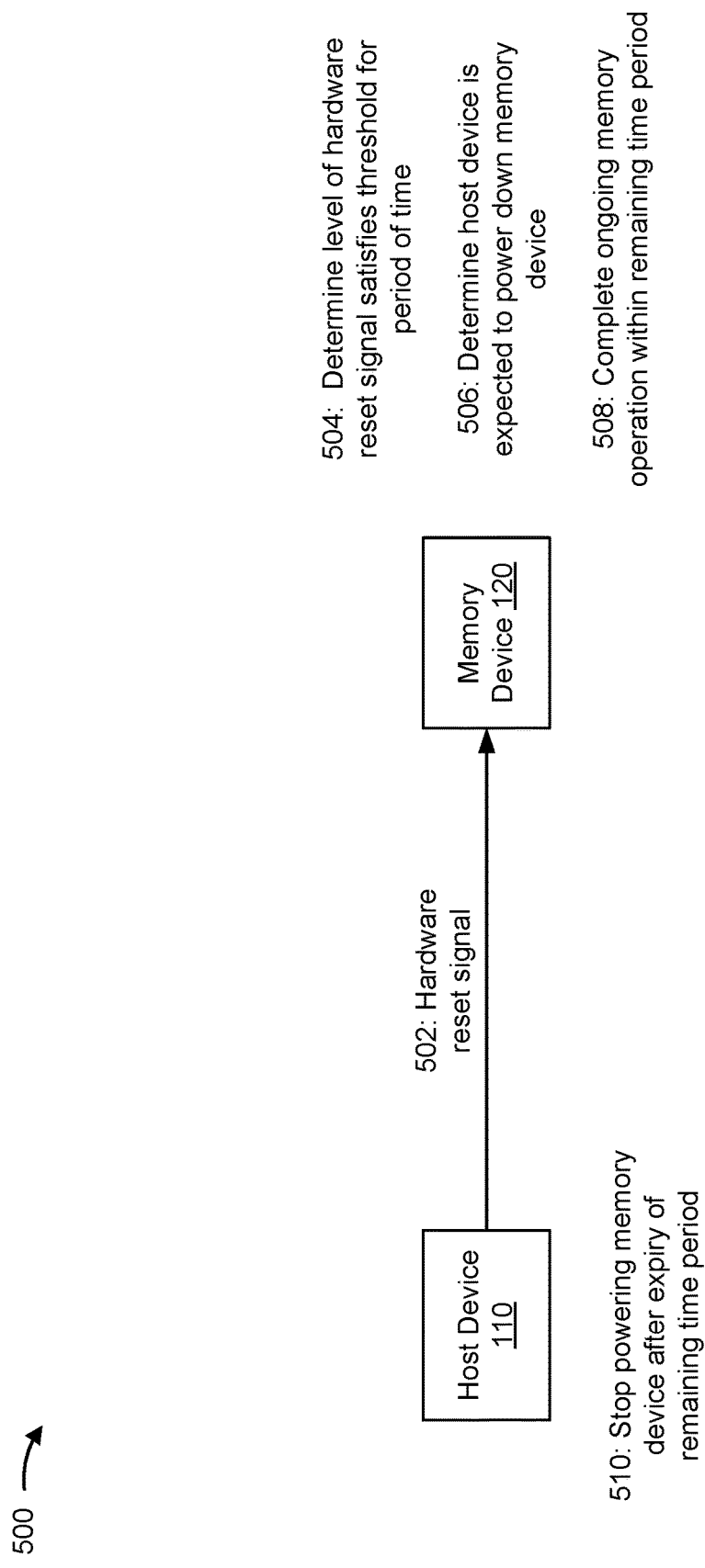
FIG. 5 is a diagram illustrating an example associated with powering down a memory device based on a hardware reset signal.

FIG. 5 is a diagram illustrating an example 500 associated with powering down a memory device 120 based on a hardware reset signal. The operations described in connection with FIG. 5 may be performed by the memory device 120 and/or one or more components of the memory device 120, such as the controller 130 and/or one or more components of the controller 130. The memory device 120 may be a UFS device, such as an mNAND device.

As shown by reference number 502, the memory device 120 may receive, from the host device 110, a hardware reset signal. The memory device 120 may receive the hardware reset signal from the host device 110 via a hardware pin associated with the memory device 120. The hardware pin may be a hardware reset input pin associated with the memory device, which may be one of a plurality of input pins associated with the memory device. The hardware reset signal may be an active low signal. The hardware reset signal may be associated with a hardware reset of the memory device 120.

As shown by reference number 504, the memory device 120 may determine that a level associated with the hardware reset signal satisfies a threshold for a period of time. For example, the hardware reset signal may be considered to be low when the hardware reset signal satisfies the threshold. The hardware reset signal must be low for the period of time. The level associated with the hardware reset signal may be a voltage level. In some implementations, the memory device 120 may determine that the hardware reset signal satisfies two separate thresholds, where a first threshold may be a level threshold and a second threshold may be a time threshold. The memory device 120 may detect when the hardware reset signal satisfies the level threshold for an amount of time that satisfies the time threshold. For example, the memory device 120 may detect when the hardware reset signal is low for 10 ms, 20 ms, 50 ms, or 100 ms.

As shown by reference number 506, the memory device 120 may determine, based on the hardware reset signal satisfying the threshold for the period of time, that the host device 110 is expected to power down the memory device 120. For example, when the hardware reset signal is low for the period of time, the memory device 120 may detect that the host device 110 is about to power down the memory device 120. In some implementations, when the hardware reset signal satisfies the level threshold for the amount of time that satisfies the time threshold, the memory device 120 may detect that the host device 110 is about to power down the memory device 120. In some implementations, the memory device 120 may determine that the host device 110 is expected to power down the memory device 120 using the hardware reset signal in lieu of a software command that provides a power off notification. In this case, the host device 110 may not send the power off notification to indicate to the memory device 120 that the host device 110 is planning to power down the memory device 120. In other words, the memory device 120 may be notified of an impending power down based on hardware instead of the software command.

In some implementations, the memory device 120 may determine that the hardware reset signal corresponds to a predefined pattern. The memory device 120 may determine that the hardware reset signal corresponds to the predefined pattern based on the level associated with the hardware reset signal satisfying the threshold for the period of time. The memory device 120 may determine, based on the hardware reset signal corresponding to the predefined pattern, that the host device 110 is expected to power down the memory device 120.

As shown by reference number 508, the memory device 120 may complete an ongoing memory operation within a remaining time period based on the determination that the host device 110 is expected to power down the memory device 120. The memory device 120 may complete any outstanding memory operations within the remaining time period. The remaining time period may be defined as a field in a register associated with the memory device 120. The memory device 120 may be able to access information regarding the remaining time period, which may allow the memory device 120 to determine the remaining time period and to complete the ongoing memory operation within the remaining time period. The memory device 120 may set the remaining time period based on an estimated amount of time needed to complete memory operations after being notified that the host device 110 is going to power down the memory device 120.

As shown by reference number 510, the host device 110 may stop powering the memory device 120 after an expiry of the remaining time period. The host device 110 may receive, from the memory device 120, an indication of the remaining time period, which may be defined as the field in the register associated with the memory device 120. The host device 110 may determine the remaining time period based on the indication received from the memory device 120. In other words, the memory device 120 may inform the host device 110 of a required power on time after the hardware reset signal is at the level for the period of time. The host device 110 may determine when the remaining time period has expired, and at that point, the host device 110 may stop providing power to the memory device 120, which may cause the memory device 120 to power down. Since the host device 110 may wait until the remaining time period has expired, and the remaining time period may be set by the memory device 120, the memory device 120 may be likely to finish any outstanding memory operations during the remaining time period. The memory device 120 may complete (or attempt to complete) any ongoing memory operations within the remaining time period in accordance with a clean power down, where the clean power down may avoid a delay at a next bootup of the memory device 120.

In some implementations, the host device 110 may not be able to send the power off notification to the memory device 120 in time before powering off the memory device 120. In this case, the hardware pin of the memory device 120 may be used to notify the memory device 120 of the impending power off. The hardware device 110 may send the hardware reset signal via the hardware pin, and when the hardware reset signal satisfies a certain level for a certain time duration, this may indicate to the memory device 120 that the hardware device 110 is about to shut the power off for the memory device 120. The memory device 110, after recognizing that the hardware reset signal is indicating the impending power off, may complete any outstanding memory operations so that the memory device 110 may be powered down cleanly (e.g., without data loss). The hardware reset signal may remain low for the remaining time period. As a result, the hardware reset signal may effectively have the same effect as the power off notification.

In some implementations, the hardware reset signal may be capable of initiating a hardware reset. For example, when the hardware reset signal is low for a period of time and then becomes high, the hardware reset may be triggered for the memory device 120. Additionally, the hardware reset signal may be capable of serving as a notification that the host device 110 is expected to power down the memory device 120. For example, when the hardware reset signal is low for a certain period of time, the memory device 120 may detect that the host device 110 is expected to power down the memory device 120. In other words, the host device 110 and the memory device 120 may use the hardware reset signal for two different purposes.

As indicated above, FIG. 5 is provided as an example. Other examples may differ from what is described with regard to FIG. 5.

Figure 6:
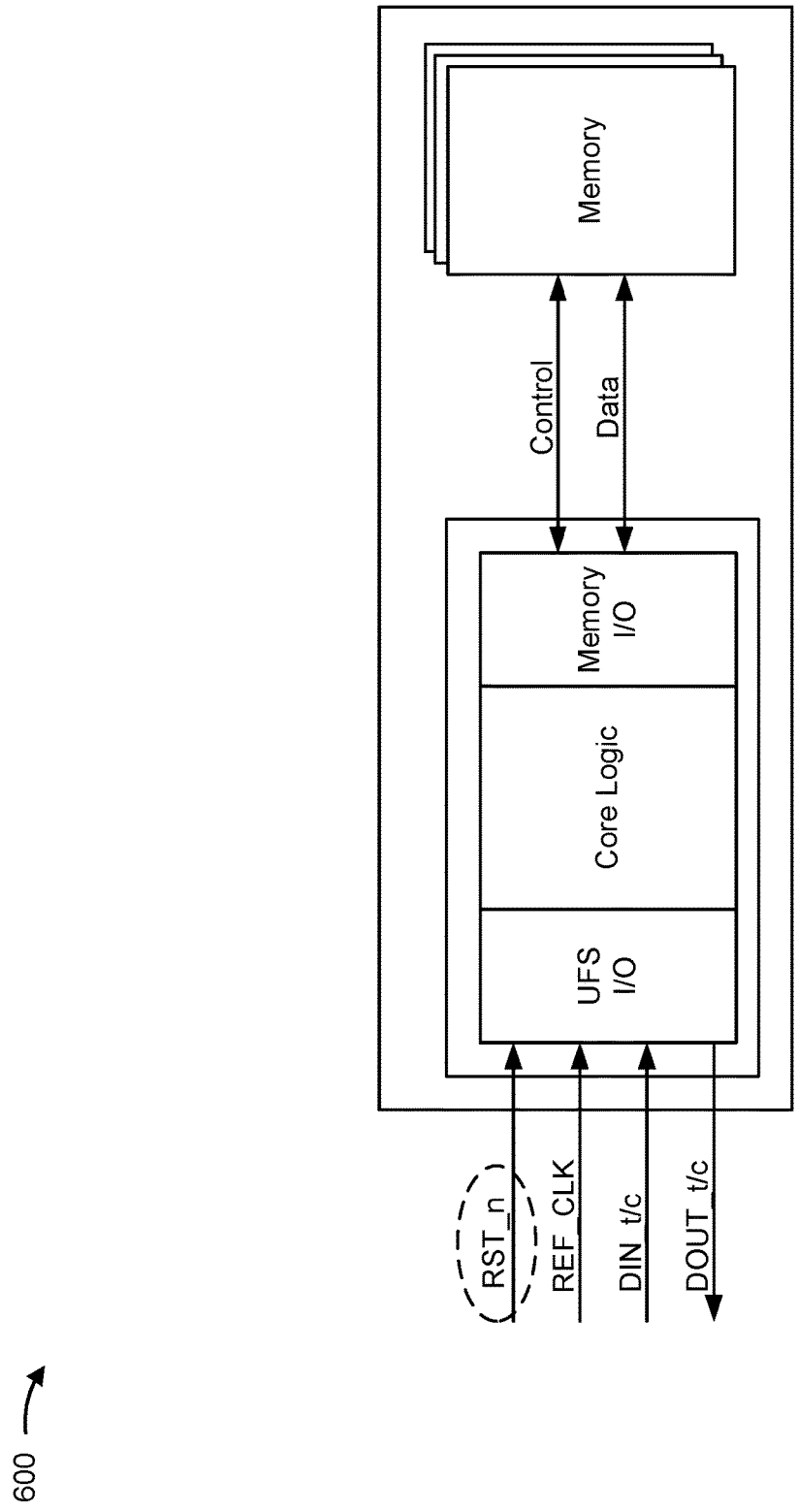
FIG. 6 is a diagram illustrating an example associated with powering down a memory device based on a hardware reset signal.

FIG. 6 is a diagram illustrating an example 600 associated with powering down a memory device 120 based on a hardware reset signal. The operations described in connection with FIG. 6 may be performed by the memory device 120 and/or one or more components of the memory device 120, such as the controller 130 and/or one or more components of the controller 130.

As shown in FIG. 6, the memory device 120 may include a UFS input/output (IO), core logic, and a memory IO. The memory IO may be used to send and receive control information and data to memory of the memory device 120. The UFS IO may receive a hardware reset signal (RST_n) as an input signal from a host device 110. The hardware reset signal may be received via a hardware pin associated with the memory device 120. The hardware reset signal may be used for notifying the memory device 120 of an upcoming power down of the memory device 120 by the host device 110, as described herein. The hardware reset signal may be within a specified range. For example, the hardware reset signal may be associated with various reset signal electrical parameters, which may include an input high voltage, an input low voltage, an input capacitance, and an input leakage current. The UFS IO may receive a reference clock (REF_CLK) as an input signal. The UFS IO may receive a differential lane input (DIN_t) and a differential input true and complement signal pair (DIN_c) as input signals. The UFS IO may provide an upstream lane output and a differential output true and complement signal pair as output signals.

As indicated above, FIG. 6 is provided as an example. Other examples may differ from what is described with regard to FIG. 6.

Figure 7:
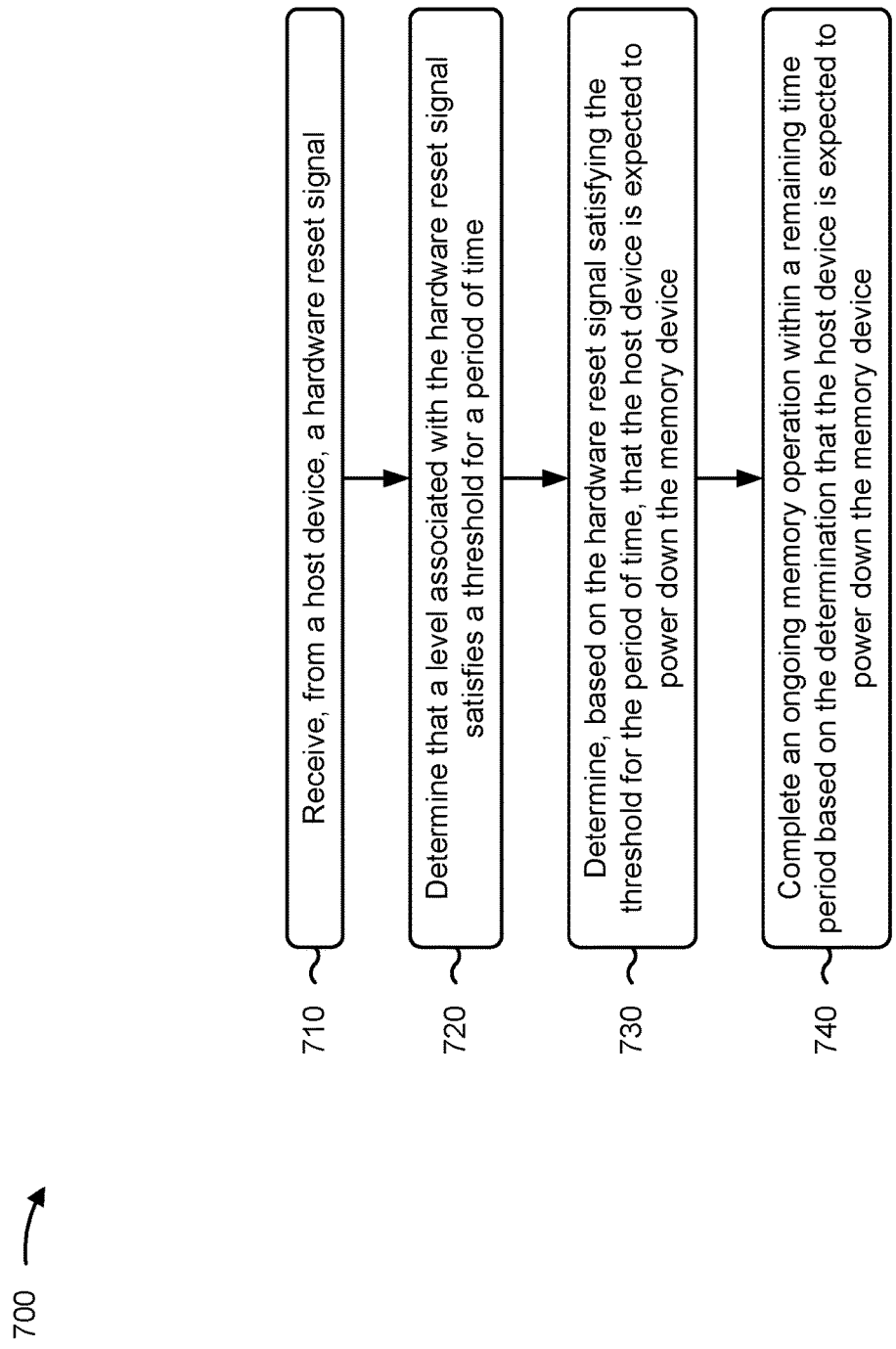
FIG. 7 is a flowchart of an example method associated with powering down a memory device based on a hardware reset signal.

FIG. 7 is a flowchart of an example method 700 associated with powering down a memory device based on a hardware reset signal. In some implementations, a memory device (e.g., the memory device 120) may perform or may be configured to perform the method 700. In some implementations, another device or a group of devices separate from or including the memory device (e.g., the system 100) may perform or may be configured to perform the method 700. Additionally, or alternatively, one or more components of the memory device (e.g., the controller 130, the memory management component 225, and/or the power down component 230) may perform or may be configured to perform the method 700. Thus, means for performing the method 700 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 700.

As shown in FIG. 7, the method 700 may include receiving, from a host device, a hardware reset signal (block 710). As further shown in FIG. 7, the method 700 may include determining that a level associated with the hardware reset signal satisfies a threshold for a period of time (block 720). As further shown in FIG. 7, the method 700 may include determining, based on the hardware reset signal satisfying the threshold for the period of time, that the host device is expected to power down the memory device (block 730). As further shown in FIG. 7, the method 700 may include completing an ongoing memory operation within a remaining time period based on the determination that the host device is expected to power down the memory device (block 740).

The method 700 may include additional aspects, such as any single aspect or any combination of aspects described below and/or described in connection with one or more other methods or operations described elsewhere herein.

In a first aspect, the memory device is powered down after an expiry of the remaining time period.

In a second aspect, alone or in combination with the first aspect, the one or more components are configured to transmit, to the host device, an indication of the remaining time period, wherein the indication of the remaining time period is defined as a field in a register associated with the memory device.

In a third aspect, alone or in combination with one or more of the first and second aspects, the one or more components are configured to complete the ongoing memory operation within the remaining time period in accordance with a clean power down, and the clean power down avoids a delay at a next bootup of the memory device.

In a fourth aspect, alone or in combination with one or more of the first through third aspects, the hardware reset signal is capable of initiating a hardware reset, and the hardware reset signal is capable of serving as a notification that the host device is expected to power down the memory device.

In a fifth aspect, alone or in combination with one or more of the first through fourth aspects, the one or more components are configured to receive the hardware reset signal from the host device via a hardware reset input pin associated with the memory device.

In a sixth aspect, alone or in combination with one or more of the first through fifth aspects, the one or more components are configured to determine that the host device is expected to power down the memory device using the hardware reset signal in lieu of a software command that provides a power off notification.

In a seventh aspect, alone or in combination with one or more of the first through sixth aspects, the memory device is a UFS device.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
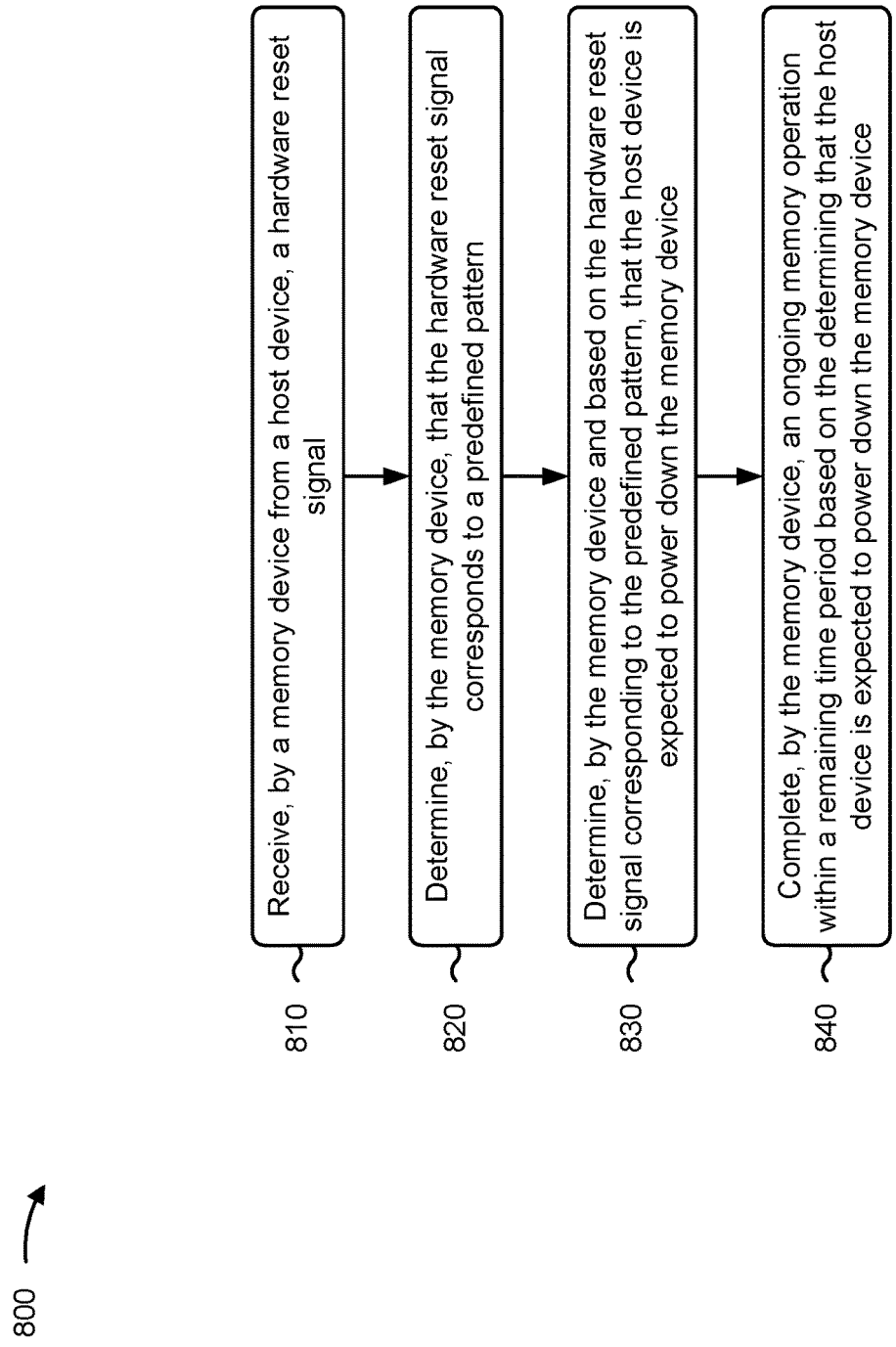
FIG. 8 a flowchart of an example method associated with powering down a memory device based on a hardware reset signal.

FIG. 8 is a flowchart of an example method 800 associated with powering down a memory device based on a hardware reset signal. In some implementations, a memory device (e.g., the memory device 120) may perform or may be configured to perform the method 800. In some implementations, another device or a group of devices separate from or including the memory device (e.g., the system 100) may perform or may be configured to perform the method 800. Additionally, or alternatively, one or more components of the memory device (e.g., the controller 130, the memory management component 225, and/or the power down component 230) may perform or may be configured to perform the method 800. Thus, means for performing the method 800 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 800.

As shown in FIG. 8, the method 800 may include receiving, by the memory device from a host device, a hardware reset signal (block 810). As further shown in FIG. 8, the method 800 may include determining, by the memory device, that the hardware reset signal corresponds to a predefined pattern (block 820). As further shown in FIG. 8, the method 800 may include determining, by the memory device and based on the hardware reset signal corresponding to the predefined pattern, that the host device is expected to power down the memory device (block 830). As further shown in FIG. 8, the method 800 may include completing, by the memory device, an ongoing memory operation within a remaining time period based on the determining that the host device is expected to power down the memory device (block 840).

The method 800 may include additional aspects, such as any single aspect or any combination of aspects described below and/or described in connection with one or more other methods or operations described elsewhere herein.

In a first aspect, method 800 includes determining that the hardware reset signal corresponds to the predefined pattern based on a level associated with the hardware reset signal satisfying a threshold for a period of time.

In a second aspect, alone or in combination with the first aspect, the method 800 includes method 800 includes transmitting, to the host device, an indication of the remaining time period, wherein the indication of the remaining time period is defined as a field in a register associated with the memory device.

In a third aspect, alone or in combination with one or more of the first and second aspects, the method 800 includes completing the ongoing memory operation within the remaining time period in accordance with a clean power down, and the clean power down avoids a delay at a next bootup of the memory device.

In a fourth aspect, alone or in combination with one or more of the first through third aspects, the method 800 includes determining that the host device is expected to power down the memory device using the hardware reset signal in lieu of a software command that provides a power off notification.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

In some implementations, a memory device includes one or more components configured to: receive, from a host device, a hardware reset signal; determine that a level associated with the hardware reset signal satisfies a threshold for a period of time; determine, based on the hardware reset signal satisfying the threshold for the period of time, that the host device is expected to power down the memory device; and complete an ongoing memory operation within a remaining time period based on the determination that the host device is expected to power down the memory device.

In some implementations, a method includes receiving, by a memory device from a host device, a hardware reset signal; determining, by the memory device, that the hardware reset signal corresponds to a predefined pattern; determining, by the memory device and based on the hardware reset signal corresponding to the predefined pattern, that the host device is expected to power down the memory device; and completing, by the memory device, an ongoing memory operation within a remaining time period based on the determining that the host device is expected to power down the memory device.

In some implementations, a system includes a host device configured to: provide a hardware reset signal at a level that satisfies a threshold for a period of time, wherein the hardware reset signal is provided based on an expected power down of a memory device; and a memory device configured to: receive the hardware reset signal from the host device; determine that the level associated with the hardware reset signal satisfies the threshold for a period of time; determine, based on the hardware reset signal satisfying the threshold for the period of time, that the host device is expected to power down the memory device; and complete any ongoing memory operations within a remaining time period based on the determination that the host device is expected to power down the memory device.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
    one or more components configured to:
        set a power on time to a field in a register of the memory device based on an estimated amount of time to complete memory operations after being notified that a host device is going to power down the memory device;

communicate, to the host device, the field;
receive, from the host device, a hardware reset signal;
determine that a level associated with the hardware reset signal satisfies a threshold for a period of time;
determine, based on the hardware reset signal satisfying the threshold for the period of time, that the host device is expected to power down the memory device; and
complete an ongoing memory operation within the power on time based on the determination that the host device is expected to power down the memory device.

2. The memory device of claim 1, wherein the memory device is powered down after an expiry of the power on time.

3. The memory device of claim 1, wherein the one or more components are configured to transmit, to the host device, an indication of the power on time, wherein the indication of the power on time is defined as the field in the register associated with the memory device.

4. The memory device of claim 1, wherein the one or more components are configured to complete the ongoing memory operation within the power on time in accordance with a clean power down, and wherein the clean power down avoids a delay at a next bootup of the memory device.

5. The memory device of claim 1, wherein the hardware reset signal is capable of initiating a hardware reset, and wherein the hardware reset signal is capable of serving as a notification that the host device is expected to power down the memory device.

6. The memory device of claim 1, wherein the one or more components are configured to receive the hardware reset signal from the host device via a hardware reset input pin associated with the memory device.

7. The memory device of claim 1, wherein the one or more components are configured to determine that the host device is expected to power down the memory device using the hardware reset signal in lieu of a software command that provides a power off notification.

8. The memory device of claim 1, wherein the memory device is a universal flash storage (UFS) device.

9. A method, comprising:
setting, by a memory device, a power on time to a field in a register of the memory device based on an estimated amount of time to complete memory operations after being notified that a host device is going to power down the memory device;
communicating, from the memory device to the host device, the field;
receiving, by the memory device from the host device, a hardware reset signal;
determining, by the memory device, that the hardware reset signal corresponds to a predefined pattern;
determining, by the memory device and based on the hardware reset signal corresponding to the predefined pattern, that the host device is expected to power down the memory device; and
completing, by the memory device, an ongoing memory operation within the power on time based on the determining that the host device is expected to power down the memory device.

10. The method of claim 9, wherein determining that the hardware reset signal corresponds to the predefined pattern is based on a level associated with the hardware reset signal satisfying a threshold for a period of time.

11. The method of claim 9, further comprising:
transmitting, to the host device, an indication of the power on time, wherein the indication of the power in time is defined as the field in the register associated with the memory device.

12. The method of claim 9, further comprising:
completing the ongoing memory operation within the power on time in accordance with a clean power down, and wherein the clean power down avoids a delay at a next bootup of the memory device.

13. The method of claim 9, further comprising:
determining that the host device is expected to power down the memory device using the hardware reset signal in lieu of a software command that provides a power off notification.

14. A system, comprising:
a host device configured to:
provide a hardware reset signal at a level that satisfies a threshold for a period of time, wherein the hardware reset signal is provided based on an expected power down of a memory device; and
the memory device configured to:
set a power on time to a field in a register of the memory device based on an estimated amount of time to complete memory operations after being notified that the host device is going to power down the memory device;
communicate, to the host device, the field;
receive the hardware reset signal from the host device;
determine that the level associated with the hardware reset signal satisfies the threshold for a period of time;
determine, based on the hardware reset signal satisfying the threshold for the period of time, that the host device is expected to power down the memory device; and
complete any ongoing memory operations within the power on time based on the determination that the host device is expected to power down the memory device.

15. The system of claim 14, wherein the memory device is powered down after an expiry of the power on time.

16. The system of claim 14, wherein the host device is configured to receive, from the host device, an indication of the power on time.

17. The system of claim 14, wherein the hardware reset signal is capable of initiating a hardware reset, and wherein the hardware reset signal is capable of serving as a notification that the host device is expected to power down the memory device.

18. The system of claim 14, wherein the hardware reset signal is associated with a hardware reset input pin of the memory device.

19. The system of claim 14, wherein the memory device is configured to determine that the host device is expected to power down the memory device using the hardware reset signal in lieu of a software command that provides a power off notification.

20. The system of claim 14, wherein the memory device is a universal flash storage (UFS) device.

* * * * *